Patented July 24, 1923.

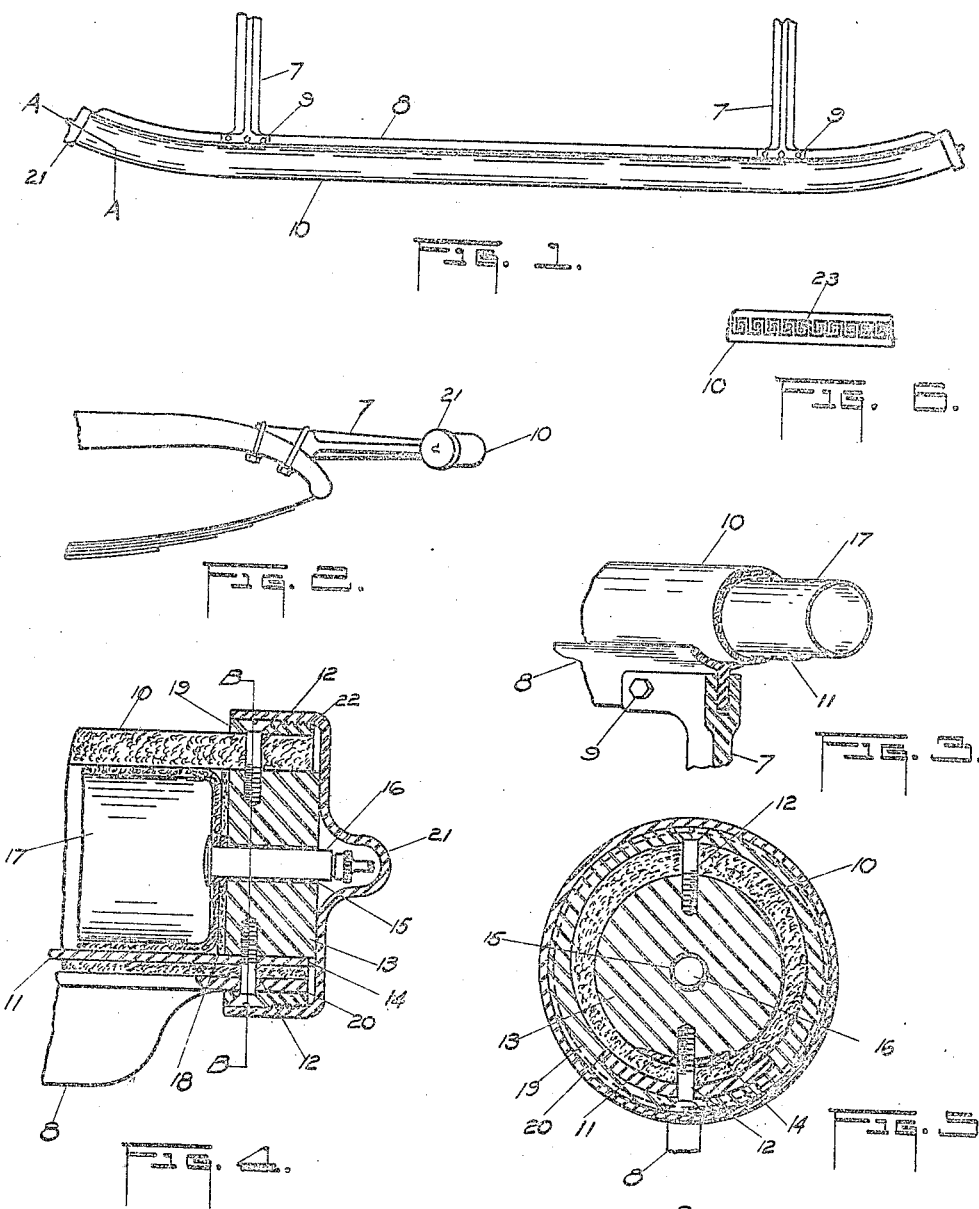

1,462,561

UNITED STATES PATENT OFFICE.

BRUNO LEWANDOWSKI, OF LOS ANGELES, CALIFORNIA.

AIR-CUSHION BUMPER FOR MOTOR VEHICLES.

Application filed May 9, 1922. Serial No. 559,534.

*To all whom it may concern:*

Be it known that I, BRUNO LEWANDOWSKI, a citizen of the United States, residing at Los Angeles, in the county of Los Angeles and State of California, have invented new and useful Improvements in Air-Cushion Bumpers for Motor Vehicles, of which the following is a specification.

My invention relates to a bumper that is particularly designed for the use upon motor vehicles.

The principal object of my invention is to provide a strong and substantial bumper that is of relatively simple structure, capable of being easily and cheaply produced and having air cushion part that will yield to a certain degree in the event that said part strikes or contacts with a fixed or movable object.

A further object of my invention is to produce a bumper of neat and pleasing appearance and design, so that when properly installed it will add materially to the appearance of the vehicle to which it is applied.

Other objects and advantages will hereinafter appear and while I have shown and will describe the preferred form of the bumper, I wish it to be understood that I do not limit myself to such preferred form, for various changes and adaptations may be made therein without departing from the spirit of my invention, as set forth in the accompanying drawings in which:

Fig. 1 is a plan view of the bumper.

Fig. 2 is a side elevational view of my improved bumper in position upon the forward end of the frame of the vehicle.

Fig. 3 shows in perspective the construction of the bumper in acordance with the present invention.

Fig. 4 is a sectional detail illustrating the valve cap taken on the line A—A of Fig. 1.

Fig. 5 is an end section taken on the line B—B of Fig. 4, showing the construction and assembling of parts relating to the invention, which is used on both ends of the bumper.

Fig. 6 is a front view of the air cushion part showing one of the various designs.

Referring by numerals to the accompanying drawing which illustrates a practical embodiment of my invention, 7 designates horizontally disposed arms that are secured in any suitable manner to the forward ends of the frame of the vehicle.

To the forward ends of these arms is secured a T-bar 8 by means of bolts 9. The said part 8 is extended through the entire length of the bumper. To the part 8 an air cushion 10 is attached by means of a steel flap 11 and screws 12 spaced at intervals through the entire length of the bumper.

On the ends the said screws 12 are firmly secured to the steel washer 13, which has a slot 14 for a passage of part 11 and also has a hole 15 to receive a standard air valve 16.

To fill the air cushion with compressed air the tube 17 is used which has an air valve 16 attached to one end only. To prevent the direct contact of tube 17 with washer 13 a felt washer 18 is used.

The ends of the air cushion are secured by means of ring 19 which in turn is secured to the washer 13 by means of screws 12 and which has a slot 20 for the location and passage of T-bar 8 and the dust cap 21 is secured on part 19 by means of thread 22 which can be taken off to fill the cushion with air. The cushion 10 has a various design 23 on front to suit requirements.

It will be seen from the above that the force of any blow received upon the bumper will be sustained and resisted by the compressed air in the cushion, with the result that damage from collisions is reduced to a minimum.

A bumper of my improved construction is relatively simple and may be easily and cheaply produced and when properly constructed, presents a neat and finished appearance.

I claim as my invention:

1. In a bumper for automobiles, a bumper bar carried on the forward end of the automobile, an air cushion bumper resting against the forward side of said bar, a ring fitting over each end of said bumper and an end of said bar, means for securing said rings to said bumper and to said bar, and caps fitting over said rings and over the ends respectively of said bumper.

2. In a bumper for automobiles, a bumper bar carried on the front of the automobile, an air cushion bumper resting against the forward side of said bar, washers in the ends respectively of said bumper, a ring fitting over each end of said bumper and an end of said bar, screws for securing each ring, an end of said bumper and one of said washers together, screws for securing each ring and end of said bumper, one of said washers and an end of said bar together, and caps fitting over said rings and over the ends respectively of said bumper.

BRUNO LEWANDOWSKI.